3,281,637
Patented Oct. 25, 1966

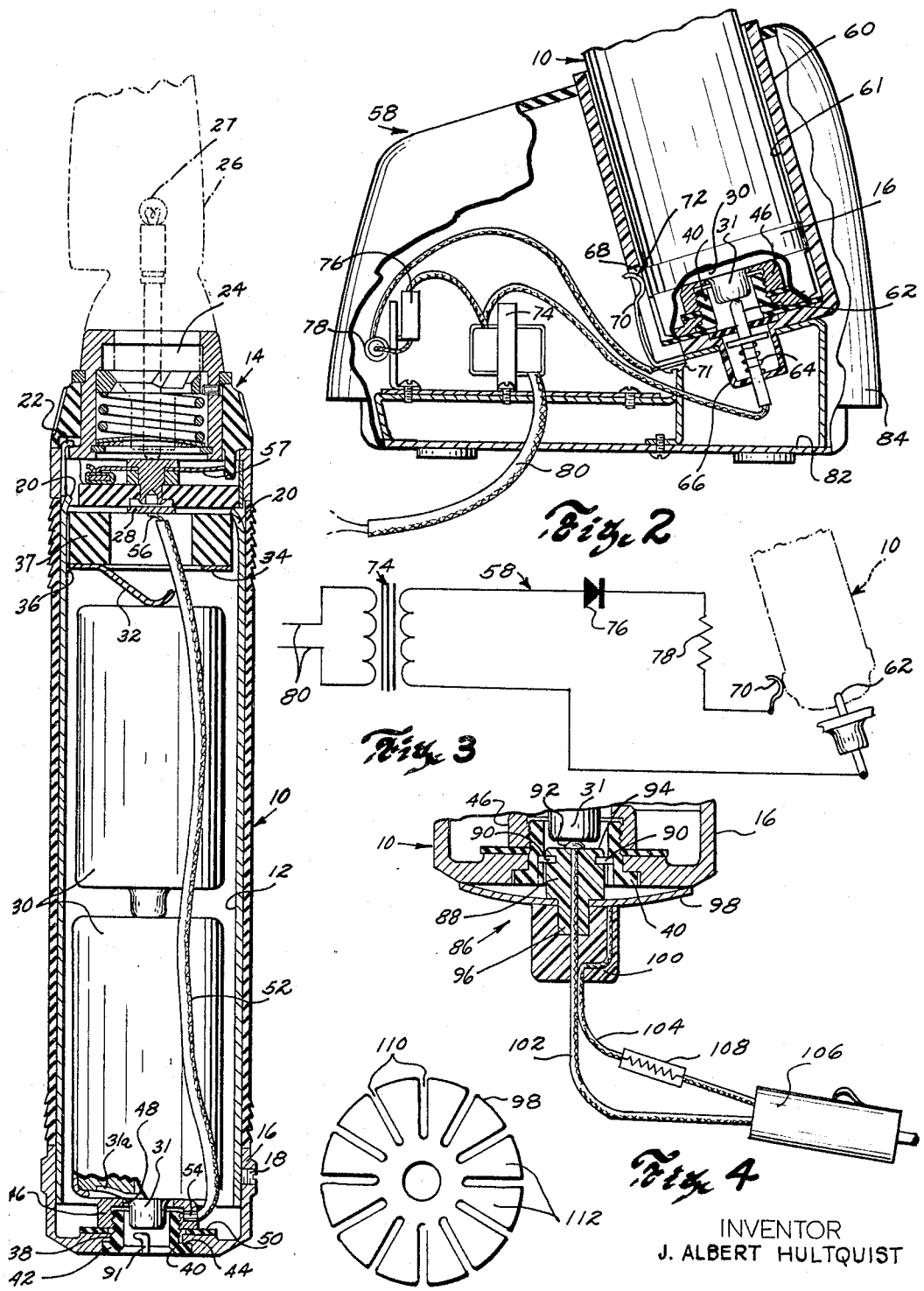

3,281,637
RECHARGEABLE FLASHLIGHT-DIRECTLY
ACCESSIBLE BATTERIES
J. Albert Hultquist, Sturbridge, Mass., assignor to American Optical Company, Southbridge, Mass., a voluntary association of Massachusetts
Filed Sept. 23, 1963, Ser. No. 310,807
8 Claims. (Cl. 320—2)

The present invention relates to handles for electrically illuminated instruments and more particularly to a novel rechargeable battery handle for supporting and energizing diagnostic instruments such as ophthalmoscopes, otoscopes and others.

An object of the present invention is to provide for compact arrangement, efficient use and simple recharging of batteries contained within such an instrument handle; and to provide for simple adaptation of the battery handle to various sources of electrical current for purposes of battery recharging.

Another object is to provide a battery handle of the above character which is so constructed and arranged as to render the terminal of a battery supported therein readily accessible for direct electrical connection to external battery recharging means and similarly accessible to testing means for determining battery condition.

A further object is to provide for testing of the load circuit and battery current source, one independently of the other, in an instrument handle of the above character without removal of the batteries or other component parts of the handle structure; and still another object is to provide a battery handle which is durable, simple in construction and reliable and efficient in operation.

Quite often, it is necessary for a diagnostician to carry various instruments during visitations away from his regularly established office. For ease and compactness of portability it is desirable to utilize a single battery handle for the operation of different instruments interchangeably applied thereto. Consequently, with frequent or continued use of the handle, the battery charge becomes discharged causing deterioration of the operating efficiency of the instruments. Without the usual conventional recharging equipment and sources of current immediately at hand and with time often being at a premium, this can present problems and, to say the least, be disconcerting. To avoid the above-mentioned problems and others, the present invention contemplates the provision of a unique rechargeable battery handle and complemental means permitting simple recharging and maintaining of the battery handle at peak operating efficiency through utilization of a vehicular electrical system as well as home or office current sources. Thus, recharging of the battery handle can be effected in a vehicle or in the home, office or examining room during periods when the handle is not required for use.

To attain the aforesaid objects, and others which may appear from the following detailed description, in accordance with one aspect of the present invention, I provide a handle including a tubular casing of a diameter and length suitable to receive and support internally thereof a battery usually, but not necessarily, consisting of a pair of secondary cells in end-to-end contacting relation with each other; the handle being readily portable and of a convenient length for handling during the performance of diagnostic or other examinations.

The battery cells presently preferred are commercially available nickel cadmium sintered plate type which are hermetically sealed and are readily rechargeable.

In the handle, the battery is disposed in an end-to-end relationship with the central protruding terminal at tthe end of one cell in contact with the flat terminal of the other. The protruding terminal of the lowermost cell is received in an opening communicating with the extension through the battery casing. This renders the said terminal immediately accessible from outside the handle. The protruding cell terminal is electrically insulated from the casing at this point and the opposite flat terminal of the uppermost cell in the battery stack is electrically connected to the casing. Spring means in electrical contact with the casing and battery stack accomplishes this end and concurrently functions to hold the battery stack resiliently against the lowermost end of the casing. To complete the load circuit in the handle, electrical connection is made with the protruding battery terminal which is disposed in the bottom opening of the casing. An electrically insulated lead extends from such connection upwardly internally through the handle to its instrument receiving end. There, instruments applied to the handle are electrically connected to one terminal of the battery stack through the electrically insulated lead and, at the same time, the instruments are electrically connected tto an opposite terminal of the battery stack through the battery casing and holding spring.

The battery stack is electrically disconnectable from the load circuit when urged upwardly in the battery casing against tension of the holding spring. Thus, when so disconnected, condition of the batteries can be checked independently of the load circuit. Likewise, a trouble check of the load circuit can be made independently of the batteries.

In the present instrument handle, one terminal of the battery stack is immediately accessible for direct connection and the other terminal is electrically accessible by making a connection to the casing whereby an external source of recharging current may be applied to the battery. Complemental means is provided for making such connection.

The present invention will be more fully understood by reference to the following detailed description which is accompanied by a drawing in which:

FIG. 1 illustrates in longitudinal cross-section an embodiment of the present invention;

FIG. 2 is a side view partially in cross-sections of a unit for recharging the embodiment of FIG. 1 in accordance with one aspect of the invention;

FIG. 3 is a schematic illustration of electrical circuitry utilized in the unit of FIG. 2;

FIG. 4 is a side view partially in cross-section of alternative means for effecting recharging of the embodiment of the invention shown in FIG. 1; and FIG. 5 is a plan view of a component part of the means illustrated in FIG. 4.

Referring now to FIG. 1 there is shown a battery handle 10 which includes tubular casing 12 having instrument adaptor 14 at one end and bottom closure or cap 16 at its opposite end. Casing 12, adapter 14 and cap 16 are formed of electrically conductive material. Cap 16 is fitted over casing 12 and removably secured in place thereon with a number of holding screws 18.

In the embodiment illustrated, adaptor 14 is fitted within casing 12 so as to bottom against locating tab portions 20 of casing 12. Tab portions 20 are directed inwardly for this purpose and ears 22 provided on the uppermost edge of casing 12 are crimped over adaptor 14 to effect its securement in casing 12.

Adaptor 14 is provided with socket 24 for reception of a diagnostic instrument or the like to be operatively attached to handle 10. A portion of an instrument 26 is, for purposes of illustration, shown by dot-dash outline as being in such operative relation with handle 10. Instrument 26 contains lamp 27 which is electrically energized through connection with rheostat terminal 28 in adaptor 14. A detailed description of the construction, operation and electrical connections in adaptor 14 may be had by reference to Patent No. 2,678,041, issued May 11, 1954, and assigned to the assignee of the present application.

Rechargeable secondary cells 30 are positioned in casing 12 in stacked relation with protruding center terminals thereof directed toward cap 16. Since such cells are hermetically sealed it is of no importance that in normal use they are inverted. The cells are urged into endwise engagement with one another and against cap 16 by spring 32. In the illustrated embodiment of the invention spring 32 is punched from or otherwise formed as an integral part of thin metallic disc 34 which, in turn, is rigidly supported in the uppermost end of casing 12 adjacent instrument adaptor 14. Disc 34 has radially extending fingers such as that shown at 36 in edgewise engagement with casing 12 at various points thereabound. Thus spring 32 being an integral part of disc 34, is electrically connected to casing 12. Disc 34 and spring 32 are electrically insulated from rheostat terminal 28 by annular block 37 formed of electrical insulating material.

In accordance with a particular feature of the present invention, terminal 31 of the lowermost cell 30 is accessible for direct connection to external sources of recharging current. In accomplishing this end, cap 16 is provided with central opening 38 in which the protruding portion of terminal 31 is received. Tubular bushing 40 of electrical insulating material extends through opening 38 into handle 10. The external end of bushing 40 is provided with flange 42 which seats against shoulder 44 in opening 38. At its opposite end, bushing 40 is externally threaded to receive retaining nut 46. Nut 46 is formed of electrical conducting material and is provided with central opening 48 through which the protruding portion of battery terminal 31 extends into bushing 40. At the same time, flanged portion 31a of terminal 31 makes electrical contact with nut 46. Firm contact of portion 31a with nut 46 is maintained by spring 32 which resiliently engages the uppermost end of the battery stack. Nut 46 is electrically insulated from cap 16 by washer 50 formed of electrical insulating material. Electrical current is delivered from battery 30 to an instrument supported in adaptor 14 by means of insulated lead 52 having one end 54 connected to nut 46 and its other end 56 connected to rheostat terminal 28 of adaptor 14. Terminal 28 is preferably connected to one end of the winding of the rheostat while the circuit continues from the central pin on which contact arm 57 rotates to the center terminal of lamp 27 as fully described in the above-mentioned Patent 2,678,041 and returns through respective body portions of instrument 26 and adaptor 14, casing 12, disc 36 and spring 32 to battery 30.

Lead 52 extends from nut 46 upwardly along the side of batteries 30 within casing 12 to rheostat terminal 28 and is of a length sufficient to permit complete removal of cap 16. In this way, the cells of battery 30 can be removed and replaced in handle 10 without disconnection of lead 52, should such action be necessary. Normally however, when the battery becomes discharged it may be recharged without removing it from handle 10. One side of recharging circuit is connected directly to the protruding portion of battery terminal 31 which is disposed within bushing 40. The other side of the recharging circuit is connected to cap 16 which, in turn, is in electrical contact with casing 12. Thus, as it can be seen, the battery recharging circuit in handle 10 includes only batteries 30, spring 32, and casing 12.

A recharger unit 58 for use in conjunction with handle 10 is illustrated in FIGS. 2 and 3. In the illustrated embodiment of the complemental unit 58, a well 60 formed of electrical insulating plastic material or the like is provided with pocket 61 adapted to freely receive the depending end portion of handle 10 for storage and recharging of batteries 30 therein. In the bottom of well 60, there is provided a centrally disposed contact pin 62 which projects longitudinally upwardly into pocket 61. Pin 62 is biased upwardly toward pocket 61 by a lightly tensioned spring 64 contained within a depending pin supporting extension 66 of well 60.

At one side of well 60 adjacent the bottom thereof, slot 68 is provided to receive spring contact 70 having one end secured to the bottom wall of well 60 with screws 71. The free end portion 72 of spring contact 70 is so contoured as to extend through slot 68 into the handle receiving pocket of well 60 substantially as illustrated in FIG. 2.

Recharger unit 58 further includes an electrical charging circuit embodying transformer 74, rectifier 76 and dropping resistor 78. Transformer 74 is adapted to be connected to a suitable source of alternating current by means of line cord 80.

Referring more particularly to FIG. 3, it can be seen that line cord 80 is connected to the primary of transformer 74. Rectifier 76 and resistor 78 are connected in series between spring contact 70 and one lead of the secondary of transformer 74. The value of resistor 78 is so chosen as to limit the rate of charge of even a completely discharged battery to a value which will not cause the evolution of gas therein to an extent which would tend to rupture the hermetic seals of the cells. The other lead of the transformer secondary is connected directly to contact pin 62.

When handle 10 is placed in well 60, pin 62 is caused to enter bushing 40 and make direct contact with terminal 31 of battery 30. Pin 62 is depressed slightly against spring 64 to effect a secure electrical connection with battery terminal 31. At the same time, spring contact 72 engages the side of cap 16 thereby making a similar resilient electrical connection with casing 12 to complete a charging circuit through battery 30. When handle 10 is removed from recharger unit 58, the charging circuit through batteries 30 is open and current from batteries 30 only is utilized to energize illuminating means in an instrument mounted on handle 10.

With recharger unit 58 utilized as a storage place for handle 10, batteries 30 can be kept at peak operating efficiency. By proper selection of the values of electrical components in unit 58, the unit can be arranged to deliver a trickle current permitting the handle to be stored indefinitely therein without battery damage.

The above-described components of recharger unit 58 are supported upon base 82 and enclosed by housing 84. For storage of more than one battery handle 10 in unit 58, additional wells 60 can be provided and connected in electrically parallel relation to the above-described unit. Each additional well would include in its circuitry, a dropping resistor 78 in series connected relationship with spring contact 70 and rectifier 76.

In another aspect of the present invention, plug 86 (see FIG. 4) is provided for adapting handle 10 to a source of direct current for recharging batteries 30 during transportation of the battery handle in an automobile or the like.

In use, plug 86 is inserted into bushing 40 in handle 10 to make simultaneous electrical contact with battery terminal 31 and with the electrically conductive lowermost portion of cap 16. Plug 86 includes end part 88 of an outer contour shape and size adapted to relatively intimately fit within bushing 40. End part 88 is formed of electrical insulating plastic material or the like and is provided with diametrically opposed locking pins 90 adapted to interengage correspondingly arranged bayonet slots 91 provided in bushing 40. As in the case of such bayonet connections, plug 86 is adapted to be inserted and detachably locked in bushing 40. When so locked in bushing 40, electrical contact 92 on end 94 of plug 86 engages battery terminal 31 making electrical connections therewith. Preferably contact 92 is of such length that it causes the battery to be lifted slightly against the pressure of spring 32 thus assuring reliable connection between contact 92 and protruding terminal 31. In the particular embodiment illustrated, part 88 of plug 86 is provided with shank 96 which is extended through dished metallic spring washer 98. Shank 96 is received in retainer 100 and is so cemented or otherwise secured therein as to form the composite structure of plug 86. Electrically insulated current carrying leads 102 and 104 are electrically connected to contact 92 and washer 98 respectively at their one ends and to a suitable adaptor plug 106 at their opposite ends for connection to the vehicular electrical system. Adaptor plug 106 may be of a type receivable in the well of an automobile cigarette lighter. Alternatively, leads 102 and 104 of plug 86 can be directly connected into the vehicular electrical system without adaptor plug 106. Connected in lead 104 is dropping resistor 108 which is of such selected value as to be properly limit the charging current applied to batteries 30. Selection of resistor 108 is made in accordance with the particular sources of direct current selected for use.

As shown in FIG. 5, washer 98 is provided with a plurality of radial slots 110 extending from an edge thereof a substantial distance toward its center. In this way, the separated marginal portions 112 of washer 98 are rendered highly resilient and make firm contact with the electrically conductive portion of cap 16 when plug 86 is operatively applied to handle 10. With plug 86 so applied to handle 10, one side of the charging circuit embodies lead 102 connected to battery terminal 31 by contact 92 and the return side of the charging circuit includes spring 32, casing 12, cap 16, dished washer 98 and lead 104 in that order.

In accordance with a particular feature of the present invention, the battery stack can be electrically disconnected from the load circuit in handle 10 simply by engaging terminal 31 in bushing 40 and forcing batteries 30 upwardly against spring 32. This breaks the electrical connection between terminal 31 and nut 46. This can also be accomplished by the insertion of plug 86 since the movement of battery 30 against the spring pressure of spring 30 disconnects the load circuit from the battery at terminal 31. Thus, testing of the condition of batteries 30 can be effected independently of the load circuit in handle 10 without removal of batteries 30. Similarly with batteries 30 so disconnected, a trouble test of the load circuit can be effected independently of the batteries by extending one probe of a testing meter through bushing 40 into contact with nut 46 while engaging cap 16 with the other meter probe.

I claim:
1. An instrument handle which comprises:
   a tubular casing;
   instrument-receiving means having an electrical load circuit adjacent one end of said casing;
   apertured closure means at the opposite end of said casing;
   said casing having a space therewithin between said instrument-receiving and closure means for receiving a number of battery cells each having an extended terminal on one end and a flat terminal at the other end with one of said extended terminals extended toward the exterior of said handle in said aperture whereby said one terminal is directly accessible from the exterior of said handle;
   means for electrically insulating said one terminal from said closure means;
   and means for electrically connecting said terminal to said electrical load circuit.
2. An instrument handle which comprises:
   an electrically-conductive tubular casing;
   instrument-receiving means at one end of said casing, said instrument-receiving means having an electrical load circuit passing therethrough from a contact disposed within said casing to said casing proper;
   apertured closure means at the opposite end of said casing;
   said casing having a space therewithin between said instrument-receiving and closure means for receiving a number of battery cells each having an extended terminal at one end and a flat terminal at the other end with one of said extended terminals extended toward the exterior of said handle in said aperture whereby said one terminal is directly accessible from the exterior of said handle;
   and electrically-conductive means adapted to individually connect said contact within said casing to said one extended terminal of said cells and one of said flat terminals of said cells to said casing.
3. An instrument handle as recited in claim 1 wherein said space in said casing is of sufficient length to permit longitudinal movement of said battery cells away from said closure means sufficiently to at least partially withdraw said one terminal from said aperture, and said handle further comprises spring means adjacent said instrument-receiving means for resiliently holding said battery cells against said closure means with said one terminal thereof extended toward the exterior of said handle in said aperture.
4. An instrument handle as recited in claim 2 including an electrically conductive ring surrounding said aperture in said closure means and insulated therefrom against which said one extended terminal of said cells makes electrical contact when extended into said aperture, said ring being connected by said electrically-conductive means to said load circuit.
5. An instrument handle as recited in claim 4 wherein said space in said casing is of a length such as to permit longitudinal movement of said battery cells away from said closure means sufficiently to move said one terminal of said battery cells out of electrical contact with said ring and said handle further comprises spring means adjacent said instrument-receiving means for resiliently holding said battery cells against said closure means with said one terminal thereof extended toward the exterior of said handle in said aperture.
6. The combination of an instrument handle and battery-recharging means comprising:
   an electrically-conductive tubular casing;
   instrument-receiving means at tone end of said casing, said instrument-receiving means having an electrical load circuit passing therethrough from a contact disposed within said casing to said casing proper;
   apertured closure means at the opposite end of said casing;
   a number of battery cells disposed within said casing with one of a pair of electrical terminals of said cells extended toward the exterior of said handle in said aperture whereby said one terminal is directly accessible from the exterior of said handle;
   electrically-conductive means individually connecting said contact within said casing to one of said pair of terminals of said cells and the other of said pair of terminals to said casing;
   and adaptor means for detachably connecting one side of a remote source of recharging current directly to said one terminal of said cells and the other side of said recharging current to an outer surface of said handle.
7. The combination as recited in claim 6 wherein said adaptor means comprises a tubular well formed of an electrical-insulating material within which said handle is received longitudinally, said well having a pair of electrical contacts one arranged to engage said outer surface of said handle and the other to directly engage said one terminal to said battery cells when said handle is received in said well, said pair of contacts being electrically connected one to each side of said source of recharging current.

8. The combination as recited in claim 6 wherein said adaptor means comprises an electrical plug receivable in said apertured closure means, said plug having a first electrical contact arranged to directly engage said one terminal of said battery cells and a second electrical contact adapted to engage a portion of said outer surface of said handle when said plug is received in said closure means, said first and second contacts being electrically connected one to each side of said source of recharging current and means for detachably connecting said plug to said closure means.

References Cited by the Examiner

UNITED STATES PATENTS

| | | | |
|---|---|---|---|
| 2,982,849 | 5/1961 | Volkerling et al. | 320—2 X |
| 3,005,090 | 10/1961 | Moore | 240—10.6 |
| 3,142,852 | 8/1964 | Phaneuf et al. | 320—2 X |
| 3,143,697 | 8/1964 | Springer | 320—2 |
| 3,201,742 | 8/1965 | English | 320—2 X |

JOHN F. COUCH, *Primary Examiner.*

LLOYD McCOLLUM, *Examiner.*

S. WEINBERG, *Assistant Examiner.*